United States Patent
Koizumi et al.

(10) Patent No.: US 6,309,739 B1
(45) Date of Patent: Oct. 30, 2001

(54) METHACRYLIC ACID ESTER RESIN COMPOSITION AND FILM MADE THEREOF

(75) Inventors: Keishi Koizumi, Settsu; Shigemi Matsumoto, Akashi; Takao Okimi, Settsu; Juuichi Nishimura, Takatsuki, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/135,022

(22) Filed: Aug. 17, 1998

(30) Foreign Application Priority Data

Aug. 19, 1997 (JP) ..................................... 9-238910

(51) Int. Cl.⁷ ....................................................... C08J 5/18
(52) U.S. Cl. ........................ 428/220; 428/327; 428/521; 525/70; 525/80; 525/191
(58) Field of Search .................................... 428/220, 521, 428/327; 525/70, 80, 191

(56) References Cited

U.S. PATENT DOCUMENTS

| | | |
|---|---|---|
| 4,564,653 | 1/1986 | Kamata . |
| 5,236,911 | 8/1993 | Koyama et al. . |
| 5,306,776 | 4/1994 | Matsumoto et al. . |
| 5,336,718 | 8/1994 | Niessner et al. . |
| 5,543,463 | 8/1996 | Kitaike et al. . |
| 5,804,287 | * 9/1998 | Hatakeyama et al. ............... 428/220 |

* cited by examiner

Primary Examiner—Cynthia H. Kelly
Assistant Examiner—Dawn L. Garrett
(74) Attorney, Agent, or Firm—Armstrong, Westerman, Hattori, McLeland & Naughton, LLP

(57) ABSTRACT

A methacrylate, resin composition having an excellent processability and capable of providing films having excellent impact resistance, transparency, weatherability, solvent resistance and plasticizer migration resistance, which comprises (A) 5 to 50% by weight of a crosslinked acrylate elastomer having a two layer structure of a crosslinked polymer component (a-1) having a glass transition temperature of −30 to 10° C. and a crosslinked polymer component (a-2) having a glass transition temperature of less than −30° C. wherein the component (a-1) is located on the inner side or the outer side and the component (a-2) is located on the outer side or the inner side, and (B) 95 to 50% by weight of an alkyl methacrylate polymer prepared by polymerizing an acrylic monomer containing 80 to 100% by weight of an alkyl methacrylate and 20 to 0% by weight of an alkyl acrylate in the presence of a chain transfer agent and in the presence or absence of the elastomer (A). The composition may further contain a core-shell polymer prepared by graft-polymerizing a monomer containing a major amount of an alkyl methacrylate onto a crosslinked acrylate polymer, whereby molded articles having a matt surface and an excellent flex whitening resistance are obtained.

11 Claims, No Drawings

METHACRYLIC ACID ESTER RESIN COMPOSITION AND FILM MADE THEREOF

BACKGROUND OF THE INVENTION

The present invention relates to a methacrylic resin composition and a film produced by molding the composition, and more particularly to a methacrylic acid ester resin composition containing a crosslinked acrylic acid ester elastomer and capable of providing a film having excellent properties such as impact resistance, transparency, weatherability, solvent resistance and plasticizer migration resistance, and a film made thereof. The present invention also relates to a methacrylic resin composition which can provide molded articles having a matt surface and a resistance to whitening owing to bending as well as the above-mentioned properties, and a film made thereof.

Methacrylic acid ester resins are particularly excellent in weatherability and transparency among plastics and have been used in various fields. For example, methacrylic resins have been widely used for the purpose of protecting various materials such as plastics, woods and metals from weathering by laminating the films thereof onto substrates of those materials. In order to improve the moldability into films and impact resistance of the methacrylic acid ester resins to be formed into the films or sheets for this purpose, it is usually practiced to disperse a rubber component into the methacrylic acid ester resins or to produce the methacrylic acid ester resins in the form of a graft polymer wherein the graft layer and the free polymer portion are softened, or in order to improve the impact resistance of the methacrylic acid ester resins, it is known to conduct a graft polymerization in multi stage to produce graft layer and free polymer having multi stage compositions, as disclosed in Japanese Patent Publication Kokoku No. 47-13371 and No. 50-9022. Also, in order to improve the impact resistance and the resistance to whitening owing to bending (hereinafter referred to as "flex whitening resistance" or "whitening resistance"), it is proposed to produce a graft polymer wherein the inner layer of a rubber polymer component has a glass transition temperature Tg of at least 10° C., as disclosed in Japanese Patent Publication Kokoku No. 59-36645 and No. 59-36646.

However, methacrylic acid ester resins according to these conventional techniques are still poor in impact resistance and, therefore, even if films thereof are laminated onto base materials, the base materials cannot be protected against breaking. Further, if the amount of a rubber component included in the methacrylic acid ester resins is increased in order to raise the impact resistance, there arises a problem that the commercial value of the products is apt to be impaired due to lowering of transparency and plasticizer migration resistance.

On the other hand, molded articles of thermoplastic resins such as acrylic resins have generally a gloss surface, but molded articles having matt surface are preferred in some uses, e.g., interior material for vehicles, furniture, housing of electric appliances, wallpaper and building materials.

Conventional methods for delustering thermoplastic resins are roughly classified into (1) embossing or sanding the surface of articles and (2) adding an inorganic or organic matting agent to the resins. The method (1) has the advantage that the physical properties are scarcely lowered. However, the productivity is low and the processing cost increases and, in addition, the matting effect is insufficient. In many cases, the method (1) is not suitable for materials or articles subjected to a secondary processing. The method (2) is applicable to materials or articles subjected to a secondary processing without substantially lowering the productivity and control of the degree of matting is possible, but has a fatal defect that the physical properties are markedly lowered. In particular, in case of using an inorganic matting agent such as silica gel, physical properties such as impact resistance, strength, elongation and transparency are markedly lowered. As an organic matting agent, particularly polymeric matting agent, it is proposed to use a crosslinked polymer having an average particle size of 35 to 500 $\mu$m obtained by suspension polymerization, as disclosed in Japanese Patent Publication Kokai No. 56-36535. The proposed matting agent shows decreased lowering of physical properties such as impact resistance, strength and elongation, but the matting effect is insufficient and the flex whitening resistance is poor. It is also proposed to deluster acrylic resins by using a matting agent in combination with a polyalkylene glycol, as disclosed in Japanese Patent Publication Kokai No. 9-272778. According to this method, the flex whitening resistance is improved, but physical properties such as impact resistance, heat resistance, strength and elongation are markedly lowered.

It is an object of the present invention to provide a methacrylic acid ester resin composition having excellent properties such as film formability, impact resistance, transparency, weatherability, solvent resistance and plasticizer migration resistance.

A further object of the present invention is to provide a methacrylic acid ester resin composition which can be stably formed by extrusion even under condition of a high drawing ratio to provide films having excellent impact resistance, transparency, weatherability, solvent resistance and plasticizer migration resistance.

A still further object of the present invention is to provide an acrylic resin film having excellent properties such as impact resistance, transparency, weatherability, solvent resistance and plasticizer migration resistance.

Another object of the present invention is to provide a thermoplastic acrylic resin composition which can provide molded articles such as films and sheets having a matt surface and having an improved flex whitening resistance without lowering impact resistance, heat resistance, tensile strength and other physical properties.

A still another object of the present invention is to provide a matt acrylic resin film having excellent flex whitening resistance, impact resistance and other physical properties.

These and other objects of the present invention will become apparent from the description hereinafter.

SUMMARY OF THE INVENTION

It has been found that an acrylic resin composition comprising a crosslinked acrylate elastomer having a two layer structure, each layer having a specific glass transition temperature Tg, and at least 50% by weight of a non-crosslinked methacrylate polymer prepared by polymerizing a monomer containing an allyl methacrylate as a main component in the presence of a chain transfer agent has excellent moldability, impact resistance, solvent resistance and plasticizer migration resistance as well as excellent weatherability and transparency.

Thus, in accordance with the present invention, there is provided a methacrylate resin composition comprising:

(A) 5 to 50% by weight of a crosslinked acrylate elastomer comprising (a-1) 20 to 80% by weight of a crosslinked polymer component having a glass transition temperature of −30 to 10° C. and comprising a monomer mixture containing 50 to 80% by weight of an alkyl acrylate and 50 to 20% by weight of an alkyl methacrylate and 0.1 to 20 parts by weight, per 100 parts by weight of said monomer mixture, of a polyfunctional monomer having at least two non-conjugated double bonds per molecule and copolymerizable with said monomer mixture, and (a-2) 80 to 20% by weight of a crosslinked polymer component having a glass transition temperature of less than −30° C. and comprising a monomer containing 80 to 100% by weight of an alkyl acrylate and 20 to 0% by weight of an alkyl methacrylate and 0.1 to 20 parts by weight, per 100 parts by weight of said monomer, of a polyfunctional monomer having at least two non-conjugated double bonds per molecule and copolymerizable with said monomer, wherein said crosslinked acrylate elastomer (A) has a two layer structure comprising said component (a-1) located on the inner side and said component (a-2) located on the outer side, or a two layer structure comprising said component (a-2) located on the inner side and said component (a-1) located on the outer side, and (B) 95 to 50% by weight of an alkyl methacrylate polymer prepared by polymerizing an acrylic monomer containing 80 to 100% by weight of an alkyl methacrylate and 20 to 0% by weight of an alkyl acryalte in the presence of 0.01 to 10 parts by weight of a chain transfer agent per 100 parts by weight of said acrylic monomer.

In a preferable embodiment of the present invention, the crosslinked acrylate elastomer (A) has a weight average particle size of 300 to 3,000 Å and a gel fraction of at least 5% by weight.

In another preferable embodiment of the present invention, the proportion of the alkyl methacrylate polymer (B) grafted onto the crosslinked elastomer (A) is from 65 to 120% by weight based on the crosslinked elastomer (A), and the methyl ethyl ketone-soluble portion in the methacrylate resin composition has a reduced viscosity of 0.1 to 0.6 dl/g.

The methacrylate resin composition can be stably formed into films which have preferably a thickness of 10 to 300 μm.

It has been also found that molded articles having a matt surface and having an improved flex whitening resistance are obtained without impairing the physical properties such as impact resistance, heat resistance, tensile strength and others by incorporating the above-mentioned methacrylate resin composition with a core-shell graft copolymer wherein an acrylic monomer is graft-polymerized onto a crosslinked acrylic polymer.

Thus, the present invention also provides a thermoplastic acrylic resin composition which comprises the above-mentioned methacrylate resin composition and (C) 0.5 to 50 parts by weight, per 100 parts by weight of the methacrylate resin composition, of a core-shell polymer prepared by graft-polymerizing (c-1) 60 to 15 parts by weight of a monomer component containing 60 to 100% by weight of an alkyl methacrylate, 0 to 40% by weight of an alkyl acrylate and 0 to 10% by weight of at least one other copolymerizable vinyl monomer onto (c-2) 40 to 85 parts by weight of a crosslinked acrylate polymer prepared by a polymerization of an acrylic monomer mixture of 40 to 90% by weight of an alkyl acryalte, 60 to 10% by weight of an alkyl methacrylate and 0 to 10% by weight of at least one other copolymerizable vinyl monomer and 0.1 to 20 parts by weight, per 100 parts by weight of the acrylic monomer mixture, of a polyfunctional monomer having at least two non-conjugated double bonds per molecule and copolymerizable with the acrylic monomer mixture, the total of the components (c-1) and (c-2) being 100 parts by weight.

The thermoplastic acrylic resin composition provides films and sheets having a matt surface.

DETAILED DESCRIPTION

The crosslinked acrylate elastomer (A) used in the present invention is composed of crosslinked polymer components (a-1) and (a-2) which form a two layer structure.

The crosslinked polymer component (a-1) is a crosslinked acrylate-based polymer having a glass transition temperature Tg of −30 to 10° C. The crosslinked polymer component (a-1) comprises an acrylic monomer containing 50 to 80% by weight of an alkyl acrylate and 50 to 20% by weight of an alkyl methacrylate, and 0.1 to 20 parts by weight, per 100 parts by weight of the acrylic monomer, of a polyfunctional monomer having at least two non-conjugated double bonds per molecule and copolymerizable with the acrylic monomer. The acrylic monomer may contain a small amount of other copolymerizable ethylenically unsaturated monomers as described later.

The alkyl acrylate used in the preparation of the crosslinked polymer component (a-1) is preferably those having a $C_1$ to $C_8$ alkyl group. Examples of the alkyl acrylate are, for instance, methyl acrylate, ethyl acrylate, propyl acrylate, butyl acrylate, 2-ethylhexyl acrylate and n-octyl acrylate. The alkyl acryaltes may be used alone or in admixture thereof The alkyl group of the alkyl acrylate may be linear or branched group. When the number of carbons of the alkyl group exceeds 8, the reaction rate becomes slow.

The alkyl methacrylate used in the preparation of the crosslinked polymer component (a-1) is preferably those having a $C_1$ to $C_4$ alkyl group. Representative alkyl methacrylate is methyl methacrylate. Besides, exemplified are ethyl methacrylate, propyl methacrylate and butyl methacrylate. The alkyl methacryaltes may be used alone or in admixture thereof. The alkyl group of the alkyl methacrylate may be linear or branched group. When the number of carbons of the alkyl group exceeds 4, the reaction rate becomes slow.

The proportions of the alkyl acrylate and the alkyl methacrylate are from 50 to 80% by weight, preferably 60 to 75% by weight, for the acrylate, and from 50 to 20% by weight, preferably 40 to 25% by weight, for the methacrylate. If the amount of the alkyl acrylate is less than 50% by weight, the impact resistance is lowered, and if the amount exceeds 80% by weight, the plasticizer migration resistance or the transparency of films is lowered.

The glass transition temperature Tg of the crosslinked polymer component (a-1) is from −30 to 10° C., preferably from −25 to 5° C., more preferably −25 to 0° C. If Tg of the component (a-1) is less than −30° C., the transparency of films or the plasticizer migration resistance is lowered, and if Tg of the component (a-1) exceeds 10° C., the impact resistance is lowered.

Another crosslinked polymer component (a-2) of the crosslinked acrylate elastomer (A) used in the present invention is a crosslinked acrylate homopolymer or copolymer having a glass transition temperature Tg of less than −30° C. The crosslinked polymer component (a-2) comprises an acrylic monomer containing 80 to 100% by weight of an alkyl acrylate and 20 to 0% by weight of an alkyl methacrylate, and 0.1 to 20 parts by weight, per 100 parts by weight of the acrylic monomer, of a polyfunctional monomer having at least two non-conjugated double bonds per molecule and copolymerizable with the acrylic monomer. The acrylic monomer may contain a small amount of other copolymerizable ethylenically unsaturated monomers as described later.

The alkyl acrylate and alkyl methacrylate used in the preparation of the crosslinked polymer component (a-2) are preferably alkyl acrylates having a $C_1$ to $C_8$ alkyl group and alkyl methacrylates having a $C_1$ to $C_4$ alkyl group, like in the case of the crosslinked polymer component (a-1). Examples of the alkyl acrylate and methacrylate used for the crosslinked polymer component (a-2) are those exemplified for the crosslinked polymer component (a-1). Each of the alkyl acrylate and the alkyl methacrylate may be used alone or in admixture thereof.

The proportions of the alkyl acrylate and the alkyl methacrylate used in the preparation of the component (a-2) are at least 80% by weight, preferably at least 90% by weight, more preferably at least 95% by weight, for the acrylate, and at most 20% by weight, preferably at most 10% by weight, more preferably at most 5% by weight, for the methacrylate. If the amount of the alkyl acrylate is less than 80% by weight, the impact resistance is lowered.

The glass transition temperature Tg of the crosslinked polymer component (a-2) is less than −30° C., preferably not more than −50° C. If Tg of the component (a-2) is not less than −30° C., the impact resistance of films is lowered.

The polyfunctional monomer having at least two non-conjugated double bonds per molecule and copolymerizable with the acrylic monomers, which is used in the preparation of the components (a-1) and (a-2), serves as a crosslinking agent or grafting agent. Compounds known as crosslinking agent and grafting agent can be used in the present invention. Examples of the polyfunctional monomer are, for instance, a vinyl group-containing polyfunctional monomer such as ethylene glycol dimethacrylate, diethylene glycol dimethacrylate, dipropylene glycol dimethacrylate, diacrylates corresponding to these dimethacrylates, divinyl benzene or divinyl adipate; an allyl group-containing polyfunctional monomer such as diallyl phthalate, diallyl maleate, allyl acrylate, allyl methacrylate, triallyl cyanurate or triallyl isocyanurate; and the like. The polyfunctional monomers may be used alone or in admixture thereof.

The polyfunctional monomer exerts an influence on the gel fraction of the crosslinked polymer component (a-1) or (a-2) and the graft ratio of the final product, namely the proportion of the resin component grafted to the elastomer (A). The polyfunctional monomer is used in an amount of 0.1 to 20 parts by weight, preferably 0.5 to 10 parts by weight, per 100 parts by weight of the acrylic monomer used for the preparation of the component (a-1) or (a-2). If the amount of the polyfunctional monomer is less than 0.1 part by weight, the transparency, the plasticizer migration resistance or the solvent resistance is lowered, and if the amount is more than 20 parts by weight, the elongation and the impact resistance are lowered.

The crosslinked acrylate elastomer (A) in the methacrylate resin composition of the present invention is composed of 20 to 80% by weight, preferably 30 to 60% by weight, of the crosslinked polymer component (a-1) having a Tg of −30 to 10° C., and 80 to 20% by weight, preferably 70 to 40% by weight, of the crosslinked polymer component (a-2) having a Tg of less than −30° C. If the amount of the component (a-1) is less than 20% by weight, the plasticizer migration resistance or solvent resistance of the methacrylate resin composition is lowered, and if the amount of the component (a-1) is more than 80% by weight, the impact resistance is lowered.

The crosslinked acrylate elastomer (A) has a two layer structure composed of the crosslinked polymer components (a-1) and (a-2). The component (a-1) may be located on the inner side and the component (a-2) be located on the outer side. Alternatively, the component (a-2) may be located on the inner side and the component (a-1) be located on the outer side. In case of forming the component (a-1) on the inner side and the component (a-2) on the outer side, the monomer for (a-1) is first polymerized and subsequently the monomer for (a-2) is polymerized. In case of forming the component (a-2) on the inner side and the component (a-1) on the outer side, the monomers are polymerized in the reverse order.

The weight average particle size of the crosslinked acrylate elastomer (A) composed of the components (a-1) and (a-2) is from 300 to 3,000 Å, preferably from 500 to 2,000 Å, more preferably from 600 to 1,800 Å, most preferably from 700 to 1,500 Å. If the weight average particle size is less than 300 Å, the impact resistance is lowered, and if the weight average particle size is more than 3,000 Å, the transparency is lowered.

The gel fraction of the crosslinked acrylate elastomer (A) is at least 5% by weight, preferably at least 10% by weight, more preferably at least 20% by weight. If the gel fraction of the elastomer (A) is less than 5% by weight, the plasticizer migration resistance, solvent resistance or impact resistance is lowered.

The alkyl methacrylate polymer component (B) used in the present invention is obtained by polymerizing a monomer containing 80 to 100% by weight of an alkyl methacrylate and 20 to 0% by weight of an alkyl acrylate in the presence of 0.01 to 10 parts by weight of a chain transfer agent per 100 parts by weight of the monomer. The alkyl methacrylate and alkyl acrylate used in the preparation of the component (B) are preferably alkyl methacrylates having a $C_1$ to $C_4$ alkyl group and alkyl acrylates having a $C_1$ to $C_8$ alkyl group, and those exemplified for the crosslinked acrylate elastomer (A) are also exemplified for the component (B). The alkyl acrylates or the alkyl methacrylates may be used alone or in admixture thereof, respectively. If the content of the alkyl methacrylate in the methacrylate polymer component (B) is less than 80% by weight, the solvent resistance is lowered.

In the polymerization for producing the alkyl methacrylate polymer component (B), the chain transfer agent is used in an amount of 0.01 to 10 parts by weight, preferably 0.05 to 5 parts by weight, per 100 parts by weight of the monomer for the component (B). If the amount of the chain transfer agent is less than 0.01 part by weight, the processability is lowered, and if the amount is more than 10 parts by weight, the solvent resistance or the transparency is lowered. The chain transfer agent is selected from those generally used in radical polymerizations. Examples thereof are, for instance, alkyl mercaptanes having 2 to 20 carbon atoms, mercapto acids, thiophenol, carbon tetrachloride, and the like. The chain transfer agents may be used alone or in admixture thereof.

The methacrylate resin composition of the present invention comprises 5 to 50 parts by weight, preferably 10 to 40 parts by weight, of the crosslinked acrylate elastomer (A), and 95 to 50 parts by weight, preferably 90 to 60 parts by weight, of the alkyl methacrylate polymer (B). If the amount of the acrylate elastomer (A) is less than 5 parts by weight, the obtained resin composition is insufficient in toughness and flexibility. If the amount of the acrylate elastomer (A) is more than 50 parts by weight, the plasticizer migration resistance or solvent resistance is lowered, and the obtained composition is hard to be stably formed into films by extrusion in a high drawing ratio, resulting in deterioration of processability.

At least a part of the alkyl methacrylate polymer (B) may be grafted onto the elastomer (A).

The graft ratio of the methacrylate resin composition of the present invention is from 50 to 150% by weight, preferably 80 to 110% by weight. The graft ratio is represented by a weight percentage of a graft component to an elastomer component onto which the graft component is grafted. If the graft ratio is less than 50%, the plasticizer migration resistance or solvent resistance tends to lower, and if the graft ratio is more than 150%, the processability is lowered.

The methyl ethyl ketone-soluble portion in the methacrylate resin composition of the present invention has a reduced viscosity of 0.1 to 0.6 dl/g, preferably 0.2 to 0.5 dl/g. If the reduced viscosity is less than 0.1 dl/g, the solvent resistance is lowered, and if the reduced viscosity is more than 0.6 dl/g, the processability is lowered.

Acrylic monomer containing alkyl acrylate and methacrylate used in the preparation of the component (a-1), (a-2) or (B) may contain other ethylenically unsaturated monomers copolymerizable with the acrylic monomer. Examples of the other ethylenically unsaturated monomers are, for instance, a vinyl halide such as vinyl chloride or vinyl bromide, a vinyl cyanide such as acrylonitrile or methacrylonitrile, a vinyl ester such as vinyl acetate or vinyl propionate, an aromatic vinyl compound such as styrene or a-methylstyrene, an aromatic vinyl derivative such as o-chlorostyrene or m-chlorostyrene, vinylidene chloride, acrylic acid and its salt such as sodium acrylate, an acrylic acid derivative such as acrylamide, methacrylic acid and its salt such as sodium methacrylate, a methacrylic acid derivative such as methacrylamide, and other vinyl compounds. The other ethylenically unsatureated monomers may be used alone or in admixture thereof.

The other ethylenically unsatureated monomers are used in an amount of at most 20% by weight, preferably at most 10% by weight, more preferably at most 5% by weight, based on the total amount of monomers used in polymerization. If the amount of the ethylenically unsatureated monomers is more than 20% by weight, there is a case that the weatherability and transparency, which are characteristic features of the methacrylate resin composition, are impaired.

The process for preparing the methacrylate resin composition of the present invention is not particularly limited. For example, suspension polymerization and emulsion polymerization are applicable to the preparation. Preferably, emulsion polymerization is carried out using alkyl acrylate, alkyl methacrylate, polyfunctional monomer and optionally other ethylenically unsaturated monomer.

In detail, emulsion polymerization is carried out, for example, in such a manner as firstly preparing the crosslinked polymer component (a-1) and then preparing the crosslinked polymer component (a-2) to give the crosslinked acrylate elastomer (A), and preparing the alkyl methacrylate polymer (B) in the same system, namely in the presence of the elastomer (A), or in another polymerization reactor separately.

In the emulsion polymerization, usual polymerization initiators, particularly initiators which produce free radicals, are used. Examples of the polymerization initiator are, for instance, an inorganic peroxide such as potassium persulfate or sodium persulfate, and an organic peroxide such as cumene hydroperoxide or benzoyl peroxide. Oil-soluble initiators such as azobisisobutyronitrile are also usable. The polymerization initiators may be used alone or in combination thereof.

These initiators may be used, as usual redox initiators, in combination with reducing agents such as sodium sulfite, sodium thiosulfate, formaldehyde sodium sulfoxylate, ascorbic acid and ferrous sulfate.

Surfactants to be used in the emulsion polymerization are not particularly limited, and usual surfactants for emulsion polymerization can be used in the present invention. Examples of the surfactact are, for instance, an anionic surfactant such as sodium alkylsulfate, sodium alkylbenzenesulfonate or sodium laurate, a non-ionic surfactant such as addition reaction product of alkylphenol and ethylene oxide. The surfactants may be used alone or in combination thereof. Cationic surfactants such as alkylamine hydrochloride may be further used, as occasion demands.

The methacrylate resin composition of the present invention is recovered, from a polymer latex as obtained by such a copolymerization, by coagulation (e.g., coagulation using a salt), washing and drying such as spray-drying or freeze-drying according to a usual manner.

The methacrylate resin composition of the present invention is particularly useful as films. The resin composition has a good high drawing processability, and can be formed by usual methods, for example, melt extrusion such as inflation method or T-die extrusion, or calendering, to provide films having excellent impact resistance, transparency, weatherability, solvent resistance and plasticizer migration resistance. Proper thickness of the films is from about 5 to about 500 μm, and preferably the thickness is from 10 to 300 μm.

The methacrylate resin composition of the present invention may contain, based on 100 parts by weight of the methacrylate resin composition, 0.5 to 50 parts by weight of a core-shell graft copolymer (C) which is prepared by graft-polymerizing (c-1) 60 to 15 parts by weight, preferably 50 to 25 parts by weight, of a monomer component containing 60 to 100% by weight, preferably at least 70% by weight, of an alkyl methacrylate, 0 to 40% by weight, preferably at most 30% by weight, of an alkyl acrylate and 0 to 10% by weight, preferably 0 to 5% by weight, of at least one other copolymerizable vinyl monomer onto (c-2) 40 to 85 parts by weight, preferably 50 to 75 parts by weight, of a crosslinked acrylate copolymer of an alkyl acrylate, an alkyl methacrylate, 0 to 10% by weight of at least one other copolymerizable vinyl monomer and 0.1 to 20 parts by weight, preferably 0.5 to 10 parts by weight, of a copolymerizable polyfunctional monomer having at least two non-conjugated double bonds per molecule based on 100 parts by weight of the total of the alkyl acrylate, the alkyl methacrylate and the other vinyl monomer, in which the ratio of the alkyl acrylate to the alkyl methacrylate in the crosslinked acrylate copolymer (c-2) is 40:60 to 90:10 by weight, preferably 50:50 to 85:15 by weight, and the total of the components (c-1) and (c-2) is 100 parts by weight. Molded articles having a matt surface are obtained by incorporating the core-shell polymer (C) to the resin composition. In particular, when the methacrylate resin composition contains a graft copolymer having a multi-layer structure wherein the alkyl methacrylate polymer (B) is grafted onto the crosslinked acrylate elastomer (A) having a two layer structure of the components (a-1) and (a-2), a good matting effect is achieved. Preferably, the core-shell polymer (C) has a weight average particle size of 0.5 to 15 μm, especially 1 to 10 μm. The crosslinked acrylate polymer core (c-2) of the core-shell polymer (C) has a single layer structure, unlike the crosslinked acrylate elastomer (A).

The same alkyl acrylates, alkyl methacrylates and polyfunctional monomers as those exemplified for the elastomer (A) can be used in the crosslinked acrylate polymer (c-2).

These may be used alone or in admixture thereof, respectively. If the amount of the alkyl acrylate in the crosslinked acrylate polymer (c-2) is less than 40% by weight based on the total of the alkyl acrylate and the alkyl methacrylate, the impact resistance is lowered, and if the amount is more than 90% by weight, the flex whitening resistance and transparency are lowered. If the amount of the polyfunctional monomer in the polymer (c-2) is less than 0.1 part by weight, the matting effect is lowered, and the amount is more than 20 parts by weight, the elongation or impact resistance of films is lowered.

If the content of the crosslinked acrylate polymer (c-2) in the core-shell polymer (C) is less than 40% by weight, the matting effect is lowered, and if the content is more than 85% by weight, the elongation or impact resistance of films is lowered.

Preferably, the core-shell polymer (C) has a weight average particle size of at least 0.5 [an from the viewpoint of matting effect, and at most 15 $\mu$m from the viewpoints of impact resistance, transparency and flex whitening resistance.

The same alkyl acrylates and alkyl methacrylates as those exemplified for the elastomer (A) can be used in the preparation of the shell (c-1). These may be used alone or in combination thereof, respectively.

The process for preparing the core-shell polymer (C) is not particularly limited. For example, suspension polymerization and emulsion polymerization are applicable to the preparation. Preferably, in order to obtain polymer particles having a weight average particle size of 0.5 to 15 $\mu$m, a suspension polymerization is carried out using alkyl acrylate, alkyl methacrylate, polyfunctional monomer and optionally other ethylenically unsaturated monomer. Also, it is possible to adjust the particle size of the obtained core-shell polymer by pulverization or melting, as occasion demands.

The core-shell polymer (C) is used in an amount of 0.5 to 50 parts by weight, preferably 1 to 40 parts by weight, more preferably 2 to 30 parts by weight, per 100 parts by weight of the methacrylate resin composition, namely per 100 parts by weight of the total of the components (A) and (B). If the amount of the core-shell polymer (C) is less than 0.5 part by weight, no desired matting effect is obtained, and if the amount is more than 50 parts by weight, moldability of the composition into films is lowered.

The methacrylate resin composition containing the core-shell polymer (C) can provide films having a matt surface and having an excellent flex whitening resistance as well as other properties such as impact resistance, transparency, weatherability, solvent resistance and plasticizer migration resistance in a good processability.

The composition of the present invention may contain various additives, e.g., inorganic or organic coloring agent such as pigment or dye, and antioxidant, ultraviolet absorber or light stabilizer for enhancing stability to heat and light.

The present invention is more specifically described and explained by means of Examples and Comparative Examples, in which all % and parts are by weight unless otherwise noted. It is to be understood that the present invention is not limited to these Examples.

In Examples and Comparative Examples, measurement and evaluation were made according to the following conditions and methods.

(1) Gel Fraction of Crosslinked Acrylate Elastomer (A) or Crosslinked Acrylate Polymer Core (c-2)

A prescribed amount of sample, namely crosslinked acrylate elastomer (A) or crosslinked acrylate polymer (c-2) was placed in a small case of a 100 mesh wire net and immersed in methyl ethyl ketone for 48 hours. The sample was dried under reduced pressure to remove methyl ethyl ketone and weighed. The gel fraction was calculated according to the following equation.

Gel fraction (%)=(W2/W1)×100

W1: Weight of original sample
W2: Weight of treated sample
(2) Glass Transition Temperature Tg Tg was calculated according to Fox equation from values described in Polymer Handbook (J. Brandrup, Interscience, 1989) (methyl methacrylate MMA: 105° C., butyl acrylate BA: −54° C.) (unit: ° C.).

(3) Graft Ratio

In 50 ml of methyl ethyl ketone was dissolved 1 mg of a sample, namely a methacrylate resin composition obtained by polymerization of a monomer for alkyl methacrylate polymer (B) in the presence of crosslinked acrylate elastomer (A). The solution was centrifuged at 30,000 r.p.m. for 2 hours to separate into soluble portion and insoluble portion. The insoluble portion was thoroughly dried by vacuum drying and weighed as a weight of an elastomer-graft portion (graft polymer wherein alkyl methacrylate polymer is grafted onto elastomer). The graft ratio was calculated according to the following equation.

Graft ratio (%)=[(Wg−Wa)]/Wa]×100

Wg: Weight of elastomer-graft portion
Wa: Weight of elasomer (A)
(4) Reduced Viscosity The methyl ethyl ketone-soluble portion obtained in the above item (3) was dissolved in N,N'-dimethyl formamide in a concentration of 0.3%, and the reduced viscosity of the 0.3% N,N'-dimethyl formamide solution was measured at 30° C. (unit: dl/g).

(5) Melt Index MI

Measured at 230° C. under a load of 3.8 kg (unit: g/10 minutes).

(6) Impact Resistance

A 50 $\mu$m thick film was laminated onto a polycarbonate sheet (thickness 0.8 mm), and a falling weight impact test of the laminate was carried out at −20° C. according to JIS K 7211. The 50% failure energy (unit: kg.m) was calculated by the equation E50=g×(mass of weight)×(50% failure height) wherein g is acceleration of gravity.

(7) Vicat Softening Point

Films were stacked and pressed to give a 3 mm thick sheet, and a Vicat test thereof was made under a load of 5 kg according to ISO-R-306 (unit: ° C.).

(8) Transparency

Total light transmission and haze of a 50 $\mu$m thick film were measured at 23° C. in a usual manner by a haze meter made by Nippon Denshoku Kogyo Kabushiki Kaisha (unit: %).

(9) Solvent Resistance

A 50 $\mu$m thick film was cut into a strip having a width of 10 mm and a length of 100 mm, and was immersed in toluene with suspending a 2.3 g weight to the strip. The time until the strip was broken was measured (unit: second).

(10) Plasticizer Migration Resistance

A molded article of a resin composition having a diameter of 1 mm and a length of 70 mm was immersed in dioctyl phthalate (DOP) at 70° C. for 24 hours, and a rate of change in diameter before and after immersion was measured (unit: %).

(11) Processability

A resin composition was extruded by a T-die extrusion method into films having a thickness of 50 μm, and the processability was evaluated according to the following criteria.

○: Composition can be stably extruded to film having a uniform thickness without breaking of the film.

X: Breaking of film occurs, and extrusion is unstable.

(12) Surface Property

The surface of the extruded film was visually observed and evaluated according to the following criteria.

○: No fish eye, burning and foreign matter are observed.

X: Any of fish eye, burning and foreign matter is observed, and the surface is uneven.

(13) Gloss

Gloss was measured at 23° C. according to JIS Z 8741 by a gloss meter made by Nippon Denshoku Kogyo Kabushiki Kaisha (unit: %).

(14) Flex Whitening Resistance

A 50 μm thick film was folded over, and the whitening resistance was evaluated according to the following criteria.

○: No whitening is observed at the fold.

X: Whitening is observed at the fold.

The abbreviations described hereinafter denote the following compounds.

OSA: Sodium dioctyl sulfosuccinate
BA: Butyl acrylate
MMA: Methyl methacrylate
CHP: Cumene hydroperoxide
AMA: Allyl methacrylate
tDM: Tertiary-dodecylmercaptane
BDMA: 1,4-Butylene glycol dimethacrylate
BPO: Benzoyl peroxide EXAMPLES 1 to 9 AND COMPARATIVE EXAMPLES 1 to 8

An 8 liter polymerization reactor equipped with a stirrer, a thermometer, a nitrogen gas inlet, a monomer feeding tube and a reflux condenser was charged with the following materials and sodium dioctyl sulfosuccinate OSA in an amount shown in Tables 1 and 2.

| Water | 200 parts |
|---|---|
| Formaldehyde sodium sulfoxylate | 0.15 part |
| Ferrous sulfate dihydrate | 0.0015 part |
| Disodium ethylenediaminetetraacetate | 0.006 part |

Air in the reactor was thoroughly replaced with nitrogen gas so as to be substantially free of oxygen, and the inner temperature was raised to 60° C. A monomer mixture (1) shown in Tables 1 and 2 was then continuously added to the reactor at a rate of 15 parts per hour to conduct a polymerization. After the completion of the addition, the polymerization was further continued for 1 hour to give a crosslinked polymer component (a-1) or (a-2) in a polymerization conversion of at least 98%.

In the presence of the crosslinked polymer component (a-1) or (a-2), a monomer mixture (2) shown in Tables 1 and 2 was then polymerized at 60° C. by continuously adding it to the reactor at a rate of 10 parts per hour. After the completion of the addition, the polymerization was further continued to produce a crosslinked polymer component (a-2) on the component (a-1), or a crosslinked polymer component (a-1) on the component (a-2), in a polymerization conversion of 98% or more, thus giving an aqueous latex of a crosslinked acrylate elastomer (A).

In the presence of the crosslinked acrylate elastomer (A), a monomer mixture (3) shown in Tables 1 and 2 was then polymerized at 60° C. by continuously adding it to the reactor at a rate of 10 parts per hour. After the completion of the addition, the polymerization was further continued to produce an alkyl methacrylate resin component (B) in a polymerization conversion of 98% or more, thus giving an aqueous latex of a methacrylate resin composition.

The obtained latex was salted out with calcium chloride, washed with water and dried to give a dry powder of the methacrylate resin composition. The dry powder was pelletized by extruding it by a vent-type extruder set at 190° C. and subjected to measurement and evaluation of properties. The residual monomer concentration in the pellets was at most 500 ppm.

The results are shown in Tables 1 and 2.

TABLE 1

| | Example | | | | | | | | |
|---|---|---|---|---|---|---|---|---|---|
| | 1 | 2 | 3 | 4 | 5 | 6 | 7 | 8 | 9 |
| OSA (part) | 0.25 | 0.25 | 0.30 | 0.08 | 0.30 | 0.25 | 0.15 | 0.40 | 0.25 |
| Mixture (1) (part) | 10 | 20 | 15 | 4 | 15 | 10 | 10 | 10 | 15 |
| MMA (%) | 30 | — | 40 | 30 | 40 | 30 | 35 | 10 | 40 |
| BA (%) | 70 | 100 | 60 | 70 | 60 | 70 | 65 | 90 | 60 |
| AMA (part) | 0.12 | 0.24 | 0.20 | 0.10 | 0.20 | 0.12 | 0.11 | 0.11 | 0.18 |
| CHP (part) | 0.02 | 0.04 | 0.03 | 0.01 | 0.03 | 0.02 | 0.02 | 0.02 | 0.02 |
| Mixture (2) (part) | 20 | 10 | 20 | 6 | 15 | 25 | 20 | 20 | 25 |
| MMA (%) | — | 30 | — | — | 5 | 10 | 5 | 40 | — |
| BA (%) | 100 | 70 | 100 | 100 | 95 | 90 | 95 | 60 | 100 |
| AMA (part) | 0.24 | 0.12 | 0.24 | 0.11 | 0.20 | 0.30 | 0.25 | 0.23 | 0.30 |
| CHP (part) | 0.04 | 0.02 | 0.04 | 0.01 | 0.03 | 0.03 | 0.03 | 0.03 | 0.03 |
| Mixture (3) (part) | 70 | 70 | 65 | 90 | 70 | 65 | 70 | 70 | 60 |
| MMA (%) | 90 | 90 | 90 | 90 | 90 | 80 | 85 | 85 | 90 |
| BA (%) | 10 | 10 | 10 | 10 | 10 | 20 | 15 | 15 | 10 |
| AMM (part) | 0.25 | 0.25 | 0.30 | 0.10 | 0.25 | 0.35 | 0.03 | 0.18 | 0.25 |
| CHP (part) | 0.30 | 0.30 | 0.27 | 0.30 | 0.30 | 0.30 | 0.30 | 0.30 | 0.25 |
| Elastomer (A) Weight average particle size (Å) | 800 | 800 | 820 | 850 | 750 | 850 | 1300 | 650 | 810 |

TABLE 1-continued

|  | Example | | | | | | | | |
|---|---|---|---|---|---|---|---|---|---|
|  | 1 | 2 | 3 | 4 | 5 | 6 | 7 | 8 | 9 |
| Gel fraction (%) | 88 | 85 | 90 | 92 | 86 | 80 | 81 | 83 | 82 |
| Tg of inner side component (° C.) | −2 | −54 | −10 | −22 | −10 | −22 | −16 | −44 | −10 |
| Tg of outer side component (° C.) | −54 | −22 | −54 | −54 | −49 | −44 | −49 | −10 | −54 |
| Graft ratio (%) | 100 | 101 | 90 | 115 | 98 | 92 | 99 | 100 | 107 |
| Reduced viscosity (dl/g) | 0.24 | 0.25 | 0.20 | 0.35 | 0.27 | 0.19 | 0.21 | 0.29 | 0.26 |
| MI (g/10 min.) | 5.5 | 5.3 | 4.7 | 3.8 | 5.2 | 5.7 | 5.9 | 4.2 | 3.8 |
| Impact resistance (kg.m) | 1.2 | 1.0 | 1.5 | 0.8 | 1.2 | 1.4 | 0.8 | 1.0 | 1.8 |
| Vicat softening point (° C.) | 72 | 73 | 70 | 72 | 72 | 71 | 69 | 70 | 67 |
| Transparency |  |  |  |  |  |  |  |  |  |
| Total light transmission (%) | 93 | 94 | 92 | 96 | 95 | 92 | 89 | 97 | 90 |
| Haze (%) | 0.8 | 0.5 | 0.9 | 0.2 | 0.4 | 0.8 | 1.1 | 0.3 | 0.9 |
| Solvent resistance (sec.) | 60 | 70 | 55 | 85 | 65 | 50 | 52 | 54 | 52 |
| Plasticizer migration resistance (%) | 25 | 20 | 30 | 9 | 27 | 24 | 30 | 20 | 31 |
| Processability | ○ | ○ | ○ | ○ | ○ | ○ | ○ | ○ | ○ |
| Surface property | ○ | ○ | ○ | ○ | ○ | ○ | ○ | ○ | ○ |

TABLE 2

|  | Comparative Example | | | | | | | |
|---|---|---|---|---|---|---|---|---|
|  | 1 | 2 | 3 | 4 | 5 | 6 | 7 | 8 |
| OSA (part) | 0.25 | 0.25 | 0.25 | 0.01 | 0.30 | 0.25 | 0.10 | 0.02 |
| Mixture (1) (part) | 30 | 10 | 10 | 15 | 15 | 25 | 10 | 1 |
| MMA (%) | — | 100 | — | 20 | 10 | 30 | 30 | 30 |
| BA (%) | 100 | — | 100 | 80 | 90 | 70 | 70 | 70 |
| AMA (part) | 0.30 | 0.10 | 0.10 | 0.15 | 0.15 | 0.28 | — | 0.04 |
| CHP (part) | 0.06 | 0.02 | 0.02 | 0.02 | 0.02 | 0.02 | 0.01 | 0.01 |
| Mixture (2) (part) | — | 20 | 20 | 20 | 20 | 30 | 20 | 2 |
| MMA (%) | — | — | 100 | — | 40 | — | 10 | 10 |
| BA (%) | — | 100 | — | 100 | 60 | 100 | 90 | 90 |
| AMA (part) | — | 0.24 | 0.24 | 0.24 | 0.25 | 0.35 | — | 0.08 |
| CHP (part) | — | 0.04 | 0.04 | 0.03 | 0.03 | 0.03 | 0.01 | 0.01 |
| Mixture (3) (part) | 70 | 70 | 70 | 65 | 65 | 45 | 70 | 97 |
| MMA (%) | 90 | 90 | 90 | 85 | 90 | 100 | 90 | 90 |
| BA (%) | 10 | 10 | 10 | 15 | 10 | — | 10 | 10 |
| tDM (part) | 0.25 | 0.25 | 0.25 | 0.30 | 8.00 | 0.25 | 0.33 | 0.40 |
| CHP (part) | 0.30 | 0.30 | 0.30 | 0.30 | 0.20 | 0.20 | 0.20 | 0.30 |
| Elastomer (A) |  |  |  |  |  |  |  |  |
| Weight average particle size (Å) | 800 | 810 | 790 | 4500 | 700 | 880 | 760 | 800 |
| Gel fraction (%) | 95 | 90 | 75 | 81 | 80 | 82 | 0 | 75 |
| Tg of inner side component (° C.) | −54 | 105 | −54 | −35 | −44 | −22 | −22 | −22 |
| Tg of outer side component (° C.) | — | −54 | 105 | −54 | −10 | −54 | −44 | −44 |
| Graft ratio (%) | 99 | 102 | 101 | 115 | 108 | 61 | 105 | 130 |
| Reduced viscosity (dl/g) | 0.23 | 0.25 | 0.29 | 0.32 | 0.05 | 0.27 | 0.25 | 0.28 |
| MI (g/10 min.) | 6.5 | 5.2 | 2.0 | 3.1 | 21.2 | 2.5 | 22.1 | 30.0 |
| Impact resistance (kg.m) | 1.2 | 0.6 | 0.1 | 1.9 | 0.5 | 1.7 | 0.1 | 0.1 |
| Vicat softening point (° C.) | 71 | 72 | 74 | 71 | 65 | 60 | 69 | 85 |
| Transparency |  |  |  |  |  |  |  |  |
| Total light transmission (%) | 75 | 94 | 94 | 78 | 90 | 85 | 95 | 96 |
| Haze (%) | 5.0 | 0.5 | 0.5 | 2.9 | 1.0 | 1.5 | 0.3 | 0.2 |
| Solvent resistance (sec.) | 40 | 50 | 60 | 30 | 5 | 15 | 75 | 80 |
| Plasticizer migration resistance (%) | 35 | 20 | 10 | 45 | 40 | 50 | 99 | 5 |
| Processability | ○ | ○ | X | ○ | ○ | X | ○ | ○ |
| Surface property | ○ | X | X | ○ | X | X | X | X |

In Examples 2 and 8 shown in Table 1, the mixture (1) constitutes the crosslinked polymer component (a-2) formed on the inner side of the particles of the elastomer (A), and the mixture (2) constitutes the crosslinked polymer component (a-1) formed on the outer side of the particles of the elastomer (A). In other Examples, the mixture (1) constitutes the crosslinked polymer component (a-1) and the mixture (2) constitutes the crosslinked polymer component (a-2).

As apparent from Tables 1 and 2, the methacrylate resin compositions of the Examples according to the present invention are excellent in processability and provide films having excellent impact resistance, transparency, solvent resistance, plasticizer migration resistance and surface property.

EXAMPLE 10

(1) Preparation of Acrylic Resins (I-1) to (I-7):

Methacrylate resin compositions composed of the elastomer component (A) and the alkyl methacrylate polymer component (B) were prepared as acrylic resins (I-1) to (I-4) (for use in Examples) and acrylic resins (I-5) to (I-7) (for use in Comparative Examples) in the same graft polymerization manner as in Example 1.

The ingredients used in the preparation and the properties of the obtained acrylic resins having a multilayer structure are shown in Table 3.

(2) Preparation of Core-shell Polymers (C1) to (C7):

An 8 liter polymerization reactor equipped with a stirrer, a thermometer, a nitrogen gas inlet, a monomer feeding tube and reflux condenser was charged with 200 parts of water, 0.05 part of sodium laurylsulfate, 0.55 part of sodium polyacrylate and 1.60 parts of sodium sulfate. Air in the reactor was thoroughly replaced with nitrogen gas so as to be substantially free of oxygen, and the inner temperature was raised to 60° C. A monomer mixture (1) shown in Table 4 was added to the reactor and polymerized in a polymerization conversion of at least 98% to give a crosslinked acrylate polymer (c-2).

In the presence of the crosslinked acryalte polymer (c-2) as a core, a monomer mixture (2) shown in Table 4 was polymerized at 60° C. by continuously adding it to the reactor at a rate of 15 parts per hour. After the completion of the addition, the polymerization was further continued until the polymerization conversion reached 98% or more to give a slurry of a core-shell polymer (C). The slurry was washed with water, dehydrated and dried, thus giving dry powders of core-shell polymers (C1) to (C4) for use in Examples and core-shell polymers (C5) to (C7) for use in Comparative Examples.

(3) Preparation of Thermoplastic Resin Compositions:

Acrylic resin (I) and core-shell polymer (C) shown in Table 5 were mixed by a Henschel mixer. The resulting mixture was extruded at 190° C. by a vent-type extruder to pelletize, and the pellets were used for measurement and evaluation of properties. The residual monomer content of the pellets was not more than 500 ppm.

The results of the measurement and evaluation of properties are shown in Table 5.

As apparent from Table 5, the resin compositions of the Examples according to the present invention can be easily processed by extrusion, injection molding or the like and provide molded articles having excellent flex whitening resistance, impact resistance, solvent resistance, plasticizer migration resistance and surface property.

In addition to the ingredients used in the Examples, other ingredients can be used in the Examples as set forth in the specification to obtain substantially the same results.

TABLE 3

| Run No. | Example | | | | Comparative Example | | |
|---|---|---|---|---|---|---|---|
| | I-1 | I-2 | I-3 | I-4 | I-5 | I-6 | I-7 |
| OSA | 0.25 | 0.25 | 0.30 | 0.08 | 0.25 | 0.25 | 0.10 |
| Mixture (1) (part) | 30 | 20 | 15 | 4 | 30 | 10 | 10 |
| MMA (%) | 30 | — | 40 | 30 | — | 100 | 30 |
| BA (%) | 70 | 100 | 60 | 70 | 100 | — | 70 |
| AMA (part) | 0.12 | 0.24 | 0.20 | 0.10 | 0.30 | 0.10 | — |
| CHP (part) | 0.02 | 0.04 | 0.03 | 0.01 | 0.06 | 0.02 | 0.01 |
| Mixture (2) (part) | 20 | 10 | 20 | 6 | — | 20 | 20 |
| MMA (%) | — | 30 | — | — | — | — | 10 |
| BA (%) | 100 | 70 | 100 | 100 | — | 100 | 90 |
| AMA (part) | 0.24 | 0.12 | 0.24 | 0.11 | — | 0.24 | — |
| CHP (part) | 0.04 | 0.02 | 0.04 | 0.01 | — | 0.04 | 0.01 |
| Mixture (3) (part) | 70 | 70 | 65 | 90 | 70 | 70 | 70 |
| MMA (%) | 90 | 90 | 90 | 90 | 90 | 90 | 90 |
| BA (%) | 10 | 10 | 10 | 10 | 10 | 10 | 10 |
| tDM (part) | 0.25 | 0.25 | 0.30 | 0.10 | 0.25 | 0.25 | 0.40 |
| CHP (part) | 0.30 | 0.30 | 0.27 | 0.30 | 0.30 | 0.30 | 0.30 |
| Elastomer (A) Weight average particle size (Å) | 800 | 800 | 820 | 850 | 800 | 810 | 800 |
| Gel fraction (%) | 88 | 85 | 90 | 92 | 95 | 90 | 0 |
| Tg of inner side component (° C.) | −22 | −54 | −10 | −22 | −54 | 105 | −22 |
| Tg of outer side component (° C.) | −54 | −22 | −54 | −54 | — | −54 | −44 |
| Graft ratio (%) | 100 | 101 | 90 | 115 | 99 | 102 | 130 |
| Reduced viscosity (dl/g) | 0.24 | 0.25 | 0.20 | 0.35 | 0.23 | 0.25 | 0.28 |

TABLE 4

| Run No. | Example | | | | Comparative Example | | |
|---|---|---|---|---|---|---|---|
| | C1 | C3 | C3 | C4 | C5 | C6 | C7 |
| Mixture (1) (part) | 60 | 65 | 85 | 45 | 30 | 75 | 40 |
| MMA (%) | 30 | 45 | 15 | 55 | 10 | 25 | 100 |
| BA (%) | 70 | 55 | 85 | 45 | 90 | 75 | — |
| BDMA (part) | 0.70 | 0.90 | 2.00 | 0.15 | 0.50 | 1.60 | 0.50 |
| BPO (part) | 0.02 | 0.01 | 0.04 | 0.02 | 0.01 | 0.03 | 0.02 |
| Mixture (2) (part) | 40 | 35 | 15 | 55 | 70 | 25 | 60 |
| MMA (%) | 90 | 80 | 95 | 85 | 95 | 60 | 100 |
| BA (%) | 10 | 20 | 5 | 15 | 5 | 40 | — |
| BPO (part) | 0.03 | 0.01 | 0.02 | 0.02 | 0.01 | 0.05 | 0.03 |
| Gel fraction of crosslinked acrylate polymer (c-2) (%) | 90 | 93 | 99 | 95 | 93 | 91 | 87 |
| Weight average particle size of core-shell polymer (C) | 5 | 3 | 7 | 13 | 8 | 30 | 2 |

TABLE 5

| Run No. | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Acrylic resin | I-1 | 100 | — | — | — | 100 | — | — | 100 | — | — | — | — | 100 | 100 |
| | I-2 | — | 100 | — | — | — | — | 100 | — | 100 | — | — | — | — | — |
| | I-3 | — | — | 100 | — | — | 100 | — | — | — | — | — | — | — | — |

TABLE 5-continued

| Run No. | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| | I-4 | — | — | — | 100 | — | — | — | — | — | — | — | — | — | — |
| | I-5 | — | — | — | — | — | — | — | — | — | 100 | — | — | — | — |
| | I-6 | — | — | — | — | — | — | — | — | — | — | 100 | — | — | — |
| | I-7 | — | — | — | — | — | — | — | — | — | — | — | 100 | — | — |
| Core-shell polymer | C1 | 6 | 8 | — | — | — | — | — | 0.1 | 70 | — | — | — | — | — |
| | C2 | — | — | 5 | — | — | — | — | — | — | 6 | — | — | — | — |
| | C3 | — | — | — | 5 | 2 | — | — | — | — | — | 5 | — | — | — |
| | C4 | — | — | — | — | — | 10 | 8 | — | — | — | — | — | — | — |
| | C5 | — | — | — | — | — | — | — | — | — | — | — | 5 | — | — |
| | C6 | — | — | — | — | — | — | — | — | — | — | — | — | 5 | — |
| | C7 | — | — | — | — | — | — | — | — | — | — | — | — | — | 6 |
| MI (g/10 min.) | | 6.5 | 6.3 | 5.3 | 8.0 | 6.8 | 6.0 | 6.2 | 6.7 | 1.5 | 7.0 | 2.5 | 22.1 | 6.4 | 6.5 |
| Impact resistance (kg.m) | | 1.2 | 1.0 | 1.5 | 0.7 | 1.4 | 0.9 | 1.1 | 1.3 | 0.3 | 1.0 | 0.2 | 0.1 | 1.3 | 1.2 |
| Vicat softening point (° C.) | | 71 | 70 | 68 | 75 | 70 | 73 | 71 | 70 | 58 | 62 | 75 | 69 | 71 | 73 |
| Transparent | | | | | | | | | | | | | | | |
| Total light transmission (%) | | 90 | 87 | 88 | 90 | 93 | 88 | 89 | 95 | 51 | 75 | 81 | 91 | 82 | 92 |
| Haze (%) | | 45 | 40 | 43 | 47 | 35 | 44 | 41 | 0.8 | 70 | 42 | 43 | 41 | 41 | 45 |
| Gloss (%) | | 30 | 28 | 34 | 35 | 45 | 27 | 33 | 143 | 10 | 30 | 34 | 39 | 40 | 41 |
| Solvent resistance | | 60 | 65 | 60 | 70 | 58 | 52 | 50 | 71 | 65 | 40 | 43 | 15 | 57 | 60 |
| Plasticizer migration resistance (%) | | 20 | 21 | 19 | 12 | 20 | 24 | 22 | 23 | 48 | 40 | 25 | 41 | 23 | 22 |
| Flex whitening resistance | | ○ | ○ | ○ | ○ | ○ | ○ | ○ | ○ | X | X | X | X | X | X |
| Processability | | ○ | ○ | ○ | ○ | ○ | ○ | ○ | ○ | X | ○ | X | X | X | X |
| Surface property | | ○ | ○ | ○ | ○ | ○ | ○ | ○ | ○ | X | ○ | X | X | X | X |

What we claim is:

1. A methacrylate resin composition comprising:
(A) 5 to 50% by weight of a crosslinked acrylate elastomer comprising (a-1) 20 to 80% by weight of a crosslinked polymer component having a glass transition temperature of −30 to 10° C. and obtained by polymerization of a monomer mixture containing 50 to 80% by weight of an alkyl acrylate and 50 to 20% by weight of an alkyl methacrylate and 0.1 to 20 parts by weight, per 100 parts by weight of said monomer mixture, of a polyfunctional monomer having at least two non-conjugated double bonds per molecule and copolymerizable with said monomer mixture, and (a-2) 80 to 20% by weight of a crosslinked polymer component having a glass transition temperature of less than −30° C. and obtained by the polymerization of a monomer containing 80 to 100% by weight of an alkyl acrylate and 0 to 20% by weight of an alkyl methacrylate and 0.1 to 20 parts by weight, per 100 parts by weight of said monomer, of a polyfunctional monomer having at least two non-conjugated double bonds per molecule and copolymerizable with said monomer, wherein said crosslinked acrylate elastomer (A) has a two layer structure comprising said component (a-1) located on the inner side and said component (a-2) located on the outer side, or a two layer structure comprising said component (a-2) located on the inner side and said component (a-1) located on the outer side, and
(B) 95 to 50% by weight of an alkyl methacrylate polymer prepared by polymerizing an acrylic monomer containing 80 to 100% by weight of an alkyl methacrylate and 20 to 0% by weight of an alkyl acrylate in the presence of 0.01 to 10 parts by weight of a chain transfer agent per 100 parts by weight of said acrylic monomer.

2. The composition of claim 1, wherein said crosslinked acrylate elastomer (A) has a weight average particle size of 300 to 3,000 Å and a gel fraction of at least 5% by weight.

3. The composition of claim 1, wherein the proportion of said alkyl methacrylate polymer (B) grafted onto said crosslinked acrylate elastomer (A) is from 65 to 120% by weight based on said crosslinked acrylate elastomer (A), and a portion soluble in methyl ethyl ketone included in the composition has a reduced viscosity of 0.1 to 0.6 dl/g.

4. A thermoplastic resin composition comprising the methacrylate resin composition of claim 1 and 0.5 to 50 parts by weight, per 100 parts by weight of said methacrylate resin composition. of a core-shell polymer (C) prepared by graft-polymerizing (c-1) 60 to 15 parts by weight of a monomer component containing 60 to 100% by weight of an alkyl methacrylate, 0 to 40% by weight of an alkyl acrylate and 0 to 10% by weight of at least one other copolymerizable vinyl monomer onto (c-2) 40 to 85 parts by weight of a crosslinked acrylate polymer prepared by a polymerization of an acrylic monomer mixture of 40 to 90% by weight of an alkyl acrylate, 60 to 10% by weight of an alkyl methacrylate and 0 to 10% by weight of at least one other copolymerizable vinyl monomer and 0.1 to 20 parts by weight, per 100 parts by weight of said acrylic monomer mixture, of a polyfunctional monomer having at least two non-conjugated double bonds per molecule and copolymerizable with said acrylic monomer mixture, the total of said components (c-1) and (c-2) being 100 parts by weight.

5. The composition of claim 4, wherein said core-shell polymer (C) has a weight average particle size of 0.5 to 15 μm.

6. A film made of the methacrylate resin composition of claim 1.

7. The film of claim 6 which has a thickness of 10 to 300 μm.

8. A film made of the thermoplastic resin composition of claim 4.

9. The film of claim 8 which has a thickness of 10 to 300 μm.

10. The composition of claim 1, wherein said crosslinked polymer component (a-1) is obtained by polymerization of a monomer mixture containing 60 to 75% by weight of an alkyl acrylate and 40 to 25% by weight of an alkyl methacrylate and 0.1 to 20 parts by weight, per 100 parts by weight of said monomer mixture, of a polyfunctional monomer having at least two non-conjugated double bonds per molecule and copolymerizable with said monomer mixture.

11. The composition of claim 1, wherein said alkyl methacrylate polymer (B) is prepared by polymerization in the presence of said crosslinked acrylate elastomer (A).

* * * * *